United States Patent
Lin et al.

(10) Patent No.: US 11,454,552 B2
(45) Date of Patent: Sep. 27, 2022

(54) THERMOELECTRIC NANOSENSOR

(71) Applicant: NATIONAL TSING HUA UNIVERSITY, Hsinchu (TW)

(72) Inventors: Zong-Hong Lin, Hsinchu (TW); Yu-Hsiang Tsao, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 392 days.

(21) Appl. No.: 16/579,815

(22) Filed: Sep. 23, 2019

(65) Prior Publication Data

US 2020/0355559 A1 Nov. 12, 2020

(30) Foreign Application Priority Data

May 9, 2019 (TW) .................................. 108116090

(51) Int. Cl.
- *G01K 7/00* (2006.01)
- *G01K 7/02* (2021.01)

(52) U.S. Cl.
CPC .......... *G01K 7/028* (2013.01); *G01K 2211/00* (2013.01)

(58) Field of Classification Search
CPC combination set(s) only.
See application file for complete search history.

(56) References Cited

U.S. PATENT DOCUMENTS

| | | | |
|---|---|---|---|
| 7,956,427 B2 | 6/2011 | Lieber et al. | |
| 8,441,255 B1* | 5/2013 | Davis | G01R 33/093 33/315 |
| 2008/0023066 A1* | 1/2008 | Hecht | H01L 51/444 427/75 |
| 2010/0055824 A1* | 3/2010 | Lin | H01L 31/03926 438/73 |
| 2012/0021954 A1 | 1/2012 | Gazit et al. | |
| 2014/0083477 A1* | 3/2014 | Haq | H01L 35/34 136/203 |
| 2014/0306143 A1* | 10/2014 | Banerjee | H01L 35/22 252/62.3 T |
| 2016/0079509 A1* | 3/2016 | Grayson | H01L 35/34 438/54 |
| 2017/0016850 A1 | 1/2017 | Tran | |
| 2018/0013051 A1* | 1/2018 | Lin | H01L 35/34 |
| 2020/0386698 A1* | 12/2020 | Choa | G01N 33/005 |
| 2021/0143307 A1* | 5/2021 | Fletcher | H01L 35/32 |

FOREIGN PATENT DOCUMENTS

| EP | 1342075 B1 | 9/2008 |
|---|---|---|
| TW | I610463 B | 1/2018 |
| TW | I644108 B | 12/2018 |

OTHER PUBLICATIONS

Yu-Hsiang Tsao et al., "A self-powered mercury ion nanosensor based on the thermoelectric effect and chemical transformation mechanism", Nano Energy, published in Aug. 2019, vol. 62, pp. 268-274, published by Elsevier Ltd., United Kingdom.

* cited by examiner

*Primary Examiner* — Lisa M Caputo
*Assistant Examiner* — Nasir U. Ahmed
(74) *Attorney, Agent, or Firm* — CKC & Partners Co., LLC

(57) ABSTRACT

A manufacturing method for a thermoelectric nanosensor includes the following steps. A first conductive material is prepared. A plurality of tellurium nanostructures are formed on the first conductive material. A second conductive material is prepared. The second conductive material is formed on the tellurium nanostructures.

10 Claims, 11 Drawing Sheets

THERMOELECTRIC NANOSENSOR

RELATED APPLICATIONS

This application claims priority to Taiwan Application Serial Number 108116090, filed May 9, 2019, which is herein incorporated by reference.

BACKGROUND

Technical Field

The present disclosure relates to a sensor. More particularly, the present disclosure relates to a thermoelectric sensor, a manufacturing method and an application method thereof.

Description of Related Art

The demands on the personal health are raised increasingly; therefore, the issue on the environmental pollution prevention is taken more seriously. Accordingly, the technologies that being capable of detecting harmful substances in the environment are getting more focus. Various kinds of waters exist in the nature and are required for human beings and factories. For example, the drinking water for human beings and the industrial water for factories. Therefore, water pollution prevention is an important issue in the environmental engineering. Conventionally, the concentration of the harmful metal ions (e.g. Hg ion) in the water can be detected through optical instruments such as a cold-vapor atomic absorption spectrometer, a flame atomic absorption spectrometer, a fluorescence spectrometer or an inductively coupled plasma atomic emission spectrometer. A quantity analysis of the concentration of the mercury ion can be performed by the aforementioned optical instruments that measure an absorption light intensity or an emission light intensity of the mercury ion. However, these kinds of optical instruments have various limitations. For example, different pre-treatment processes for a sample are required when using different kinds of optical instruments. Furthermore, the spectrometers are commonly equipped with many optical components, therefore the volume thereof are large and have bad portability. Furthermore, the precise optical components are costly and bring inconvenience of operation.

The nanotechnology generates new opportunities of detecting the environmental pollution. When a material is downsized to the nano scale, a surface effect will be dramatically manifested owing to an increased ratio between surface atoms and non-surface atoms. Furthermore, a quantification phenomenon of the energy level (also called quantum size effect) will also be dramatically manifested. In other word, nano materials have quite different material properties from normal materials. Therefore, environmental pollution detecting methods or instruments that utilizing the material properties change when a nano material absorbs energy of the substance in the environment became more popular.

SUMMARY

According to one aspect of the present disclosure, a manufacturing method for a thermoelectric nanosensor is disclosed. The manufacturing method includes: preparing a first conductive material; forming a plurality of tellurium nanostructures on the first conductive material; preparing a second conductive material; and forming the second conductive material on the tellurium nanostructures.

According to another aspect of the present disclosure, a thermoelectric nanosensor is disclosed. The thermoelectric nanosensor includes a first conductive material, a plurality of tellurium nanostructures, an isolation layer and a second conductive material. The tellusrium nanostructures are located on the first conductive material. The isolation layer is located on the tellurium nanostructures. The second conductive material is located on the tellurium nanostructures.

According to still another aspect of the present disclosure, an application method of the aforementioned thermoelectric nanosensor is disclosed. The application method includes: reacting a test sample with each of the tellurium nanostructures of the thermoelectric nanosensor to form a plurality of telluride nanostructures; applying a temperature variation to each of the telluride nanostructures to output an electrical signal; and measuring the electrical signal through the first conductive material and the second conductive material of the thermoelectric nanosensor.

According to further another aspect of the present disclosure, an application method of the aforementioned thermoelectric nanosensor is disclosed. The application method includes: attaching a test sample on each of the tellurium nanostructures of the thermoelectric nanosensor for changing a resistance of the thermoelectric nanosensor; applying a temperature variation to the thermoelectric nanosensor to output an electrical signal; and measuring the electrical signal through the first conductive material and the second conductive material of the thermoelectric nanosensor.

DETAILED DESCRIPTION

Figure 1:
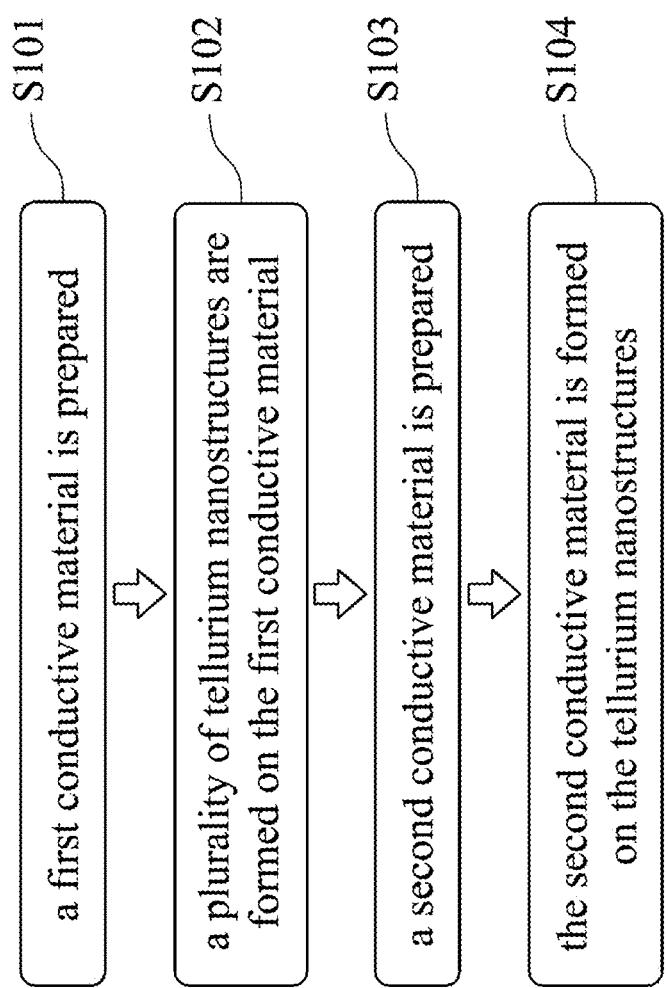
FIG. 1 is a flow chart showing a manufacturing method for a thermoelectric nanosensor according to one embodiment of the present disclosure.

FIG. 1 is a flow chart showing a method for manufacturing a thermoelectric nanosensor according to one embodiment of the present disclosure. The method includes a step S101, a step S102, a step S103 and a step S104. In the step S101, a first conductive material is prepared. In the step S102, a plurality of tellurium nanostructures are formed on the first conductive material. In the step S103, a second conductive material is prepared. In the step S104, the second conductive material is formed on the tellurium nanostructures. In the aforementioned method, the tellurium nanostructures can be formed on the first conductive material using a chemical synthesis method, a chemical deposition method or a physical deposition method. The chemical (physical) deposition method can be a chemical (physical) vapor phase deposition method or a chemical (physical) liquid phase deposition method, there is no limitation.

Figure 2:
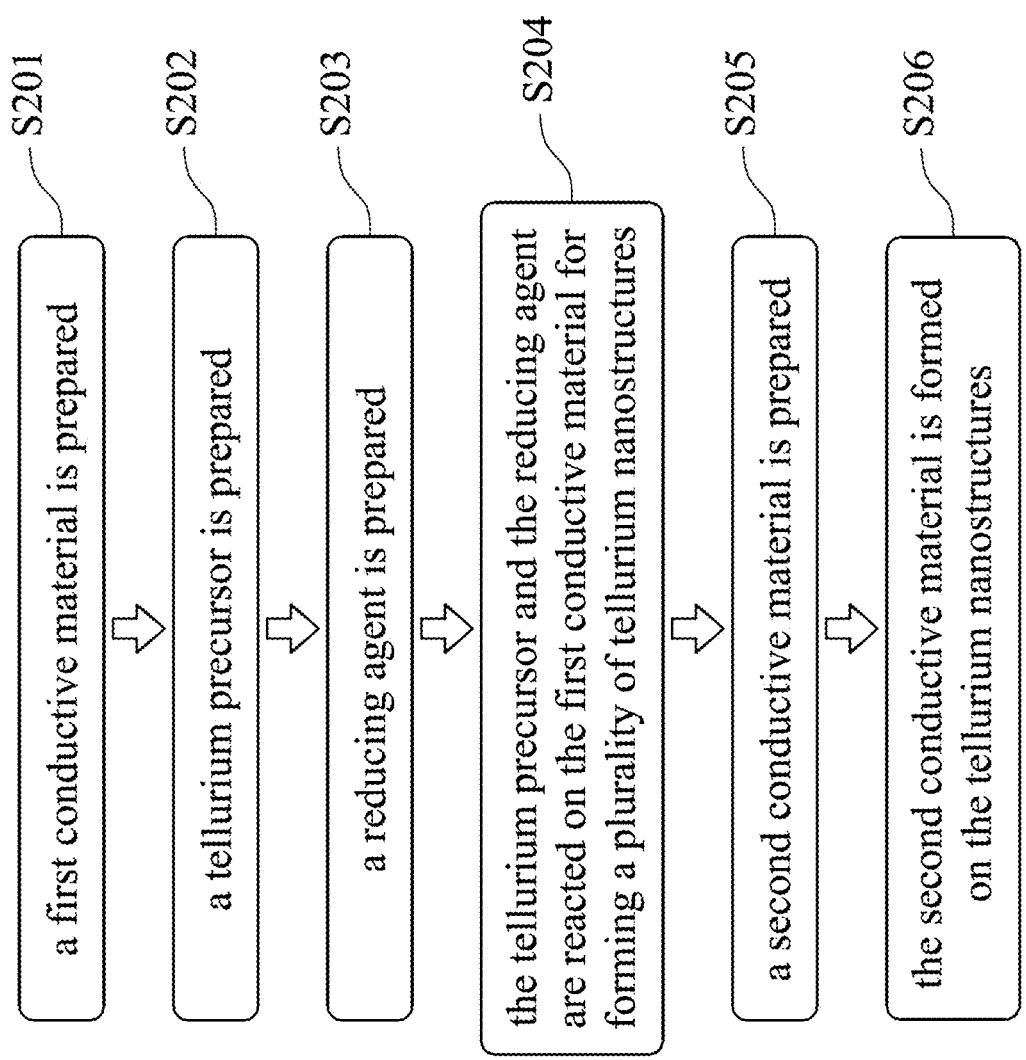
FIG. 2 is a flow chart showing a manufacturing method for a thermoelectric nanosensor according to another embodiment of the present disclosure.

FIG. 2 is a flow chart showing a manufacturing method for a thermoelectric nanosensor according to another embodiment of the present disclosure. In the embodiment, a chemical synthesis method is demonstrated for manufacturing the tellurium nanostructures. The method of FIG. 2 includes a step S201, a step S202, a step S203, a step S204, a step S205 and a step S206. In the step S201, a first conductive material is prepared. In the step S202, a tellurium precursor is prepared. In the step S203, a reducing agent is prepared. In the step S204, the tellurium precursor and the reducing agent are reacted on the first conductive material for forming a plurality of tellurium nanostructures. In the step S205, a second conductive material is prepared. In the step S206, the second conductive material is formed on the tellurium nanostructures.

In the step S202, the tellurium precursor can be Te, TeO, $TeO_2$, $TeO_3$, $Te_2O_5$, $H_2TeO_3$, $K_2TeO_3$, $Na_2TeO_3$, $H_2TeO_4$, $K_2TeO_4$, $Na_2TeO_4$ or $H_2Te$, etc.

In the step S203, the reducing agent can be $N_2H_4$ or other material that can reduce the tellurium precursor.

The principles, structures, materials and operation mechanisms of the thermoelectric nanosensors manufactured by the aforementioned methods are then described.

Figure 3:
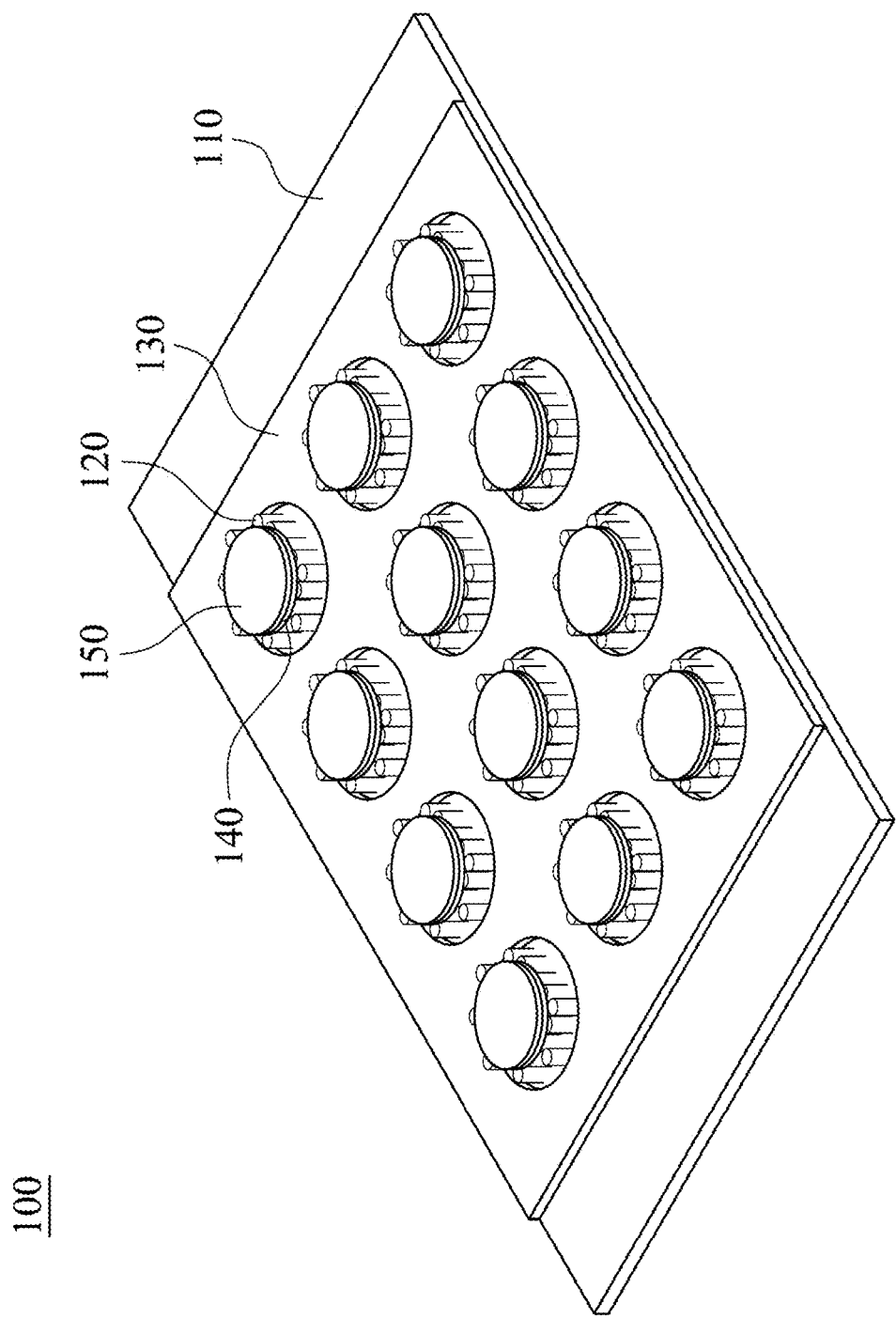
FIG. 3 is a schematic view showing a structure of a thermoelectric nanosensor according to still another embodiment of the present disclosure.

FIG. 3 is a schematic view showing a structure of a thermoelectric nanosensor 100 according to still another embodiment of the present disclosure. The thermoelectric nanosensor 100 includes a first conductive material 110, a plurality of tellurium nanostructures 120, a patterned layer 130, an isolation layer 140 and a second conductive material 150. The tellurium nanostructures 120 are located on the first conductive material 110. The patterned layer 130 is located on the first conductive layer 110, and divides the tellurium nanostructures 120 into a plurality of regions. Different regions can be used for performing different measurements in the same time. The patterned layer 130 can be made of a polyethylene terephthalate, a polyethylene, a polypropylene, a polyvinyl chloride, a polystyrene or a polycarbonate. The isolation layer 140 is located on the tellurium nanostructures 120, and the second conductive material 150 is also formed on the tellurium nanostructures 120. The isolation layer 140 can be used to isolate the first conduct material 110 and the second conductive material 120 for preventing an electrical error during a measurement (e.g. a short circuit). The isolation layer 140 can be made of a polypyrrole, a polyaniline, a polythiophene, a polyphenylene sulfide, a polyacetylene, a phenylacetylene or a derivative thereof. The first conductive material 110 can be acted as a substrate where the tellurium nanostructures 120 are directly grown thereon. The first conductive material 110 can also be acted as an electrode of the thermoelectric nanosensor 100. The first conductive material 110 can be made of Al, but will not be limited thereto. The second conductive material 150 can be made of a metal, a conductive oxide or a conductive polymer. The material of the second conductive material 150 can be ITO (Indium Tin Oxides), Au, Ag, Pt, Al, Ni, Cu, Ti, Cr, Se or an alloy thereof. The second conductive material 150 can be acted as another electrode of the thermoelectric nanosensor 100. The tellurium nanostructure 120 can be a zero dimensional structure, a one dimensional structure or a two dimensional structure. The zero dimensional structure can be a nanoparticle, the one dimensional structure can be a nanowire or a nanorod, the two dimensional structure can be a nanofilm.

Figure 4A:
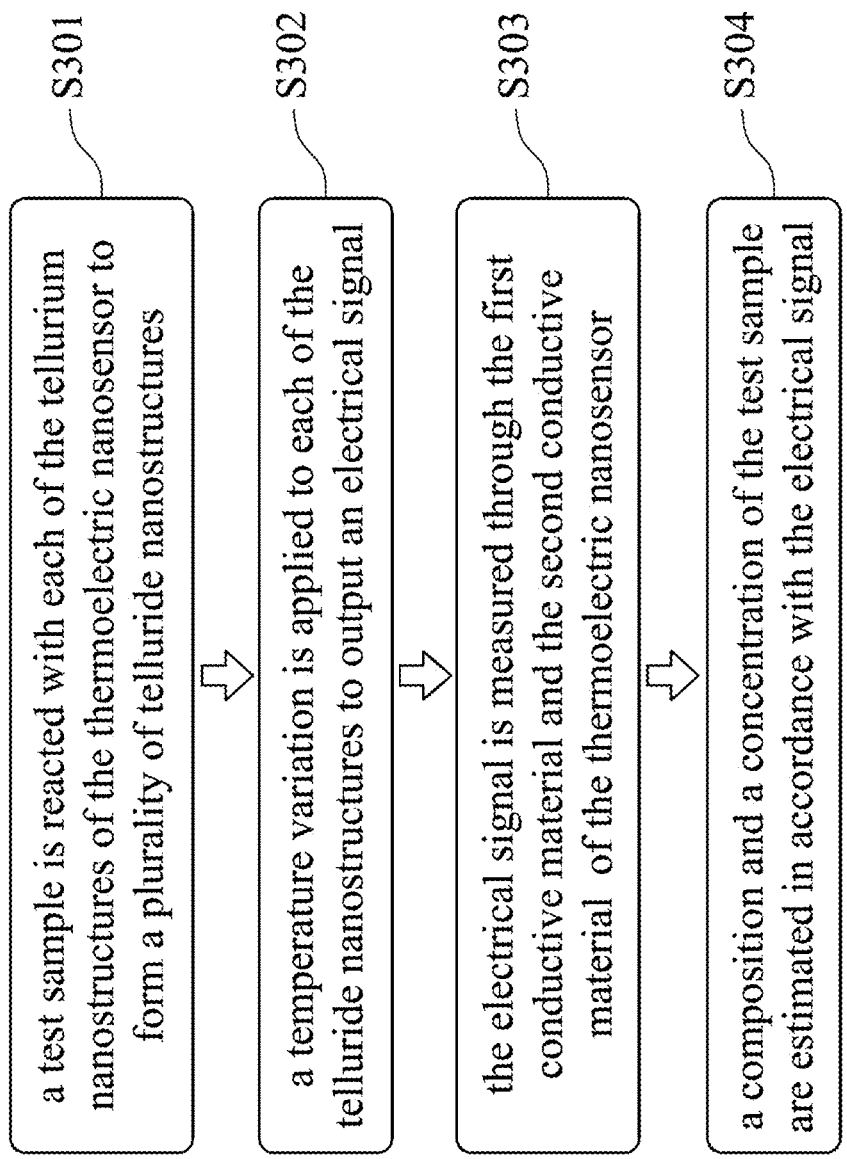
FIG. 4A is a flow chart showing an application method of the thermoelectric nanosensor of FIG. 3.
Figure 4B:
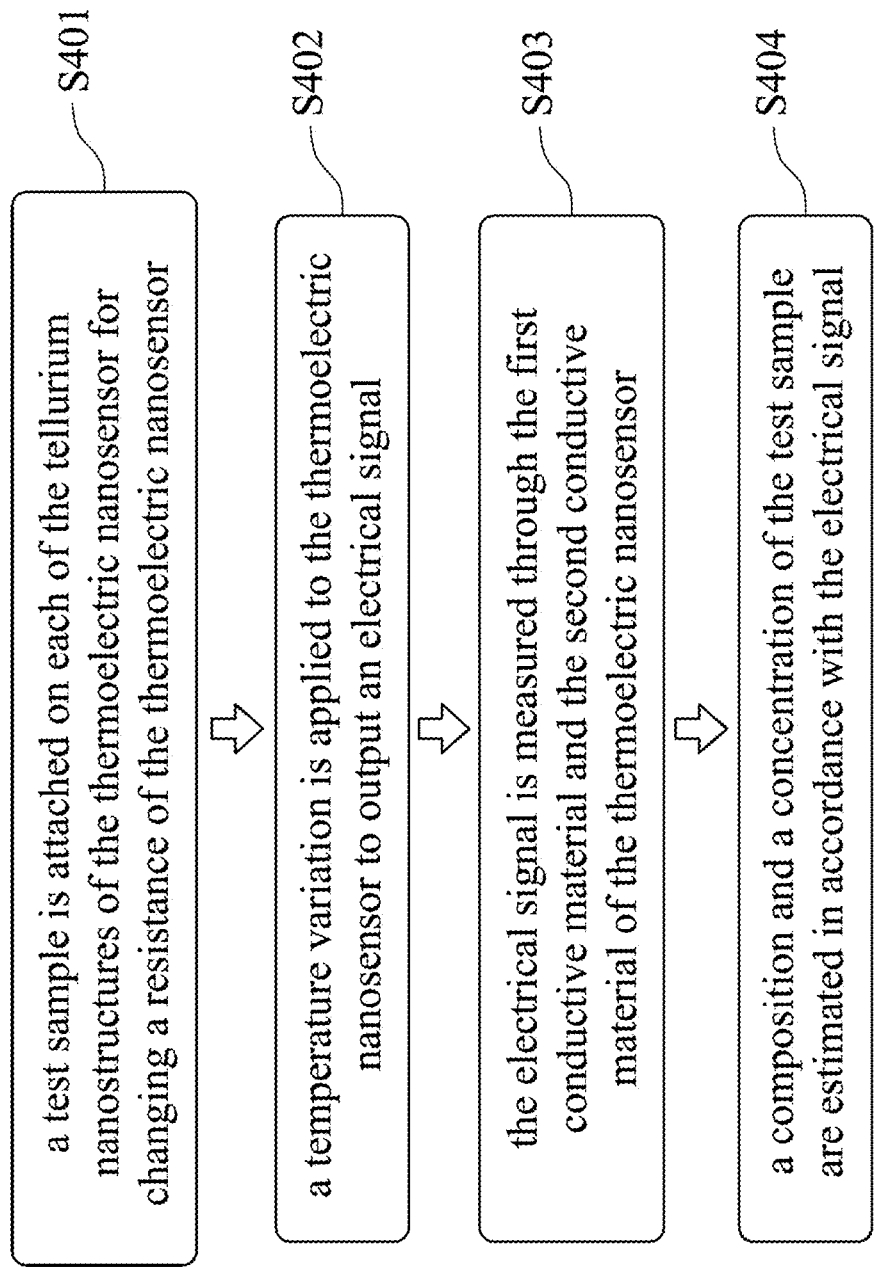
FIG. 4B is a flow chart showing another application method of the thermoelectric nanosensor of FIG. 3.

FIG. 4A is a flow chart showing an application method of the thermoelectric nanosensor 100 of FIG. 3. FIG. 4B is a flow chart showing another application method of the thermoelectric nanosensor 100 of FIG. 3. In FIG. 4A, an application method of the thermoelectric nanosensor 100 includes a step S301, a step S302, a step S303 and a step S304. In the step S301, a test sample is reacted with each of the tellurium nanostructures of the thermoelectric nanosensor to form a plurality of telluride nanostructures. In the step S302, a temperature variation is applied to each of the telluride nanostructures to output an electrical signal. In the step S303, the electrical signal is measured through the first conductive material and the second conductive material of the thermoelectric nanosensor. In the step S304, a composition and a concentration of the test sample are estimated in accordance with the electrical signal. In FIG. 4B, another application method of the thermoelectric nanosensor 100 includes a step S401, a step S402, a step S403 and a step S404. In the step S401, a test sample is attached on each of the tellurium nanostructures of the thermoelectric nanosensor for changing a resistance of the thermoelectric nanosensor. In the step S402, a temperature variation is applied to the thermoelectric nanosensor to output an electrical signal. In the step S403, the electrical signal is measured through the first conductive material and the second conductive material of the thermoelectric nanosensor. In the step S404, a composition and a concentration of the test sample are estimated in accordance with the electrical signal. In the aforementioned embodiments, the tellurium nanostructure 120 has a thermoelectric effect itself. In other word, when a temperature variation is applied to the tellurium nanostructure 120, an electrical signal is generated (e.g. voltage). The temperature variation can be an increasing of the temperature (heating) or a decreasing of the temperature (cooling). The thermoelectric effect is strong due to the nano scale. When the tellurium nanostructure 120 is reacted with a test sample having some kind of specified material, the formed telluride nanostructure also has a strong thermoelectric effect. The thermoelectric effect of the telluride nanostructure may be greater than the thermoelectric effect of the tellurium nanostructure 120. In another embodiment, the test sample is directly attached on the tellurium nanostructure 120, thereby changing the resistance of the thermoelectric nanosensor 100. Therefore, an electrical signal can also be generated owing to the thermoelectric effect. Therefore, in FIG. 4A, the test sample is reacted with the tellurium nanostructure 120 to form a telluride nanostructure. In FIG. 4B, the test sample is not reacted with the tellurium nanostructure 120 but is directly attached on the tellurium nanostructure 120, thus new compound is not formed. Not all of the materials can be reacted with the tellurium nanostructure 120 to form the telluride nanostructure and having a thermoelectric effect. Therefore, the electrical signal generated owing to the thermoelectric effect can be used to detect whether a specified test sample exists. Furthermore, since a specified ratio exists between the electrical signal generated from the thermoelectric effect and a concentration of the test sample, the concentration of the test sample can be estimated through the electrical signal. In the following embodiments, the thermoelectric nanosensor 100 is used for detecting a mercury ion ($Hg^{2+}$) in the environment. However, it should be known that there may exist another material that can be reacted with the tellurium nanostructures 120 for forming the telluride nanostructure and generating the thermoelectric effect. Furthermore, the thermoelectric nanosensor 100 can generate electrical signal through the thermoelectric effect, therefore, the thermoelectric nanosensor 100 of the present disclosure is self-powered and without requiring an external power. During a detecting process, a water solution that containing the mercury ion is dropped on the thermoelectric nanosensor 100. In order to completely mixing the thermoelectric nanosensor 100 with the water solution, the thermoelectric nanosensor 100 is stand under a temperature of 60° C. for 30 minutes. Thereby, the mercury ion in the water solution will be reacted with the tellurium nanostructure 100 of the thermoelectric nanosensor 100 for forming the telluride nanostructure, and a strong thermoelectric effect is generated for generating an output voltage. The output voltage can be measured through the two electrodes (the first conductive material 110 and the second conductive material 150) of the thermoelectric nanosensor 100. An analysis and a verification of the thermoelectric nanosensor 100 reacted with the mercury ion are then described in the following paragraphs.

Figure 6:
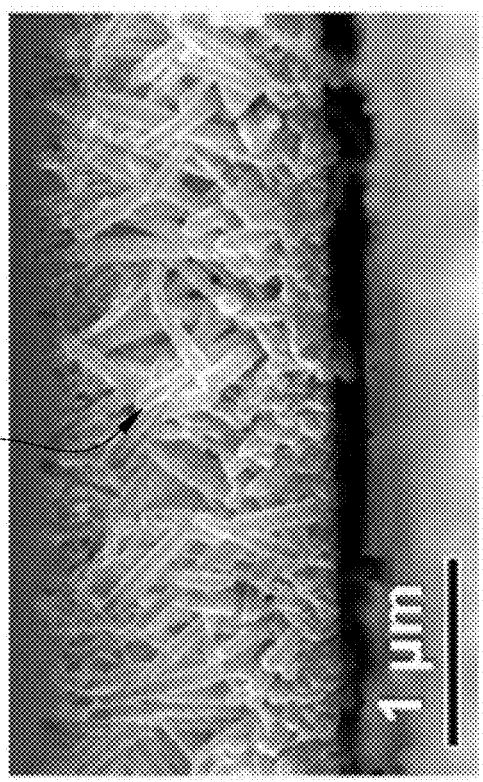
FIG. 6 is a cross-sectional electron microscope image after reacting the thermoelectric nanosensor of FIG. 3 with a mercury ion.
Figure 5:
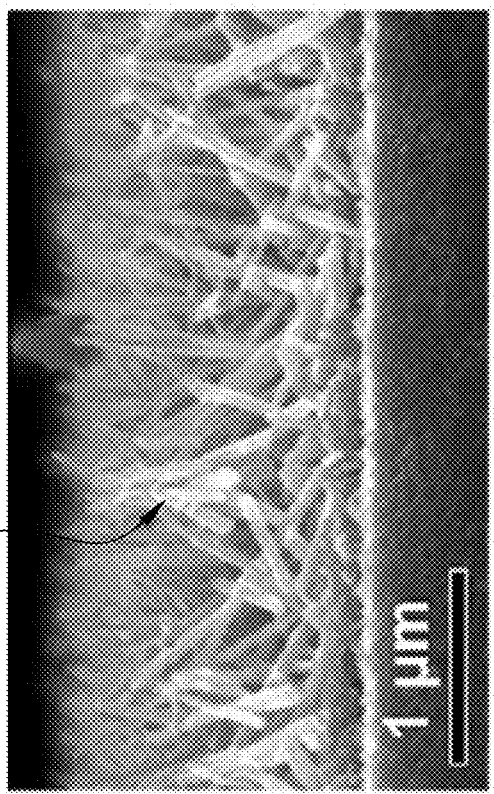
FIG. 5 is a cross-sectional electron microscope image before reacting the thermoelectric nanosensor of FIG. 3 with a mercury ion.

FIG. 5 is a cross-sectional electron microscope image before reacting the thermoelectric nanosensor 100 of FIG. 3 with a mercury ion. FIG. 6 is a cross-sectional electron microscope image after reacting the thermoelectric nanosensor 100 of FIG. 3 with a mercury ion. In FIG. 5, a smooth surface morphology of the tellurium nanostructure 120 can be observed. In FIG. 6, the surface morphology of the nanostructure has changed from smooth to rough. Furthermore, a diameter of the nanostructure in FIG. 6 is greater than a diameter of the nanostructure of FIG. 5, indicating that the mercury telluride nanostructure 121 being formed.

Figure 7:
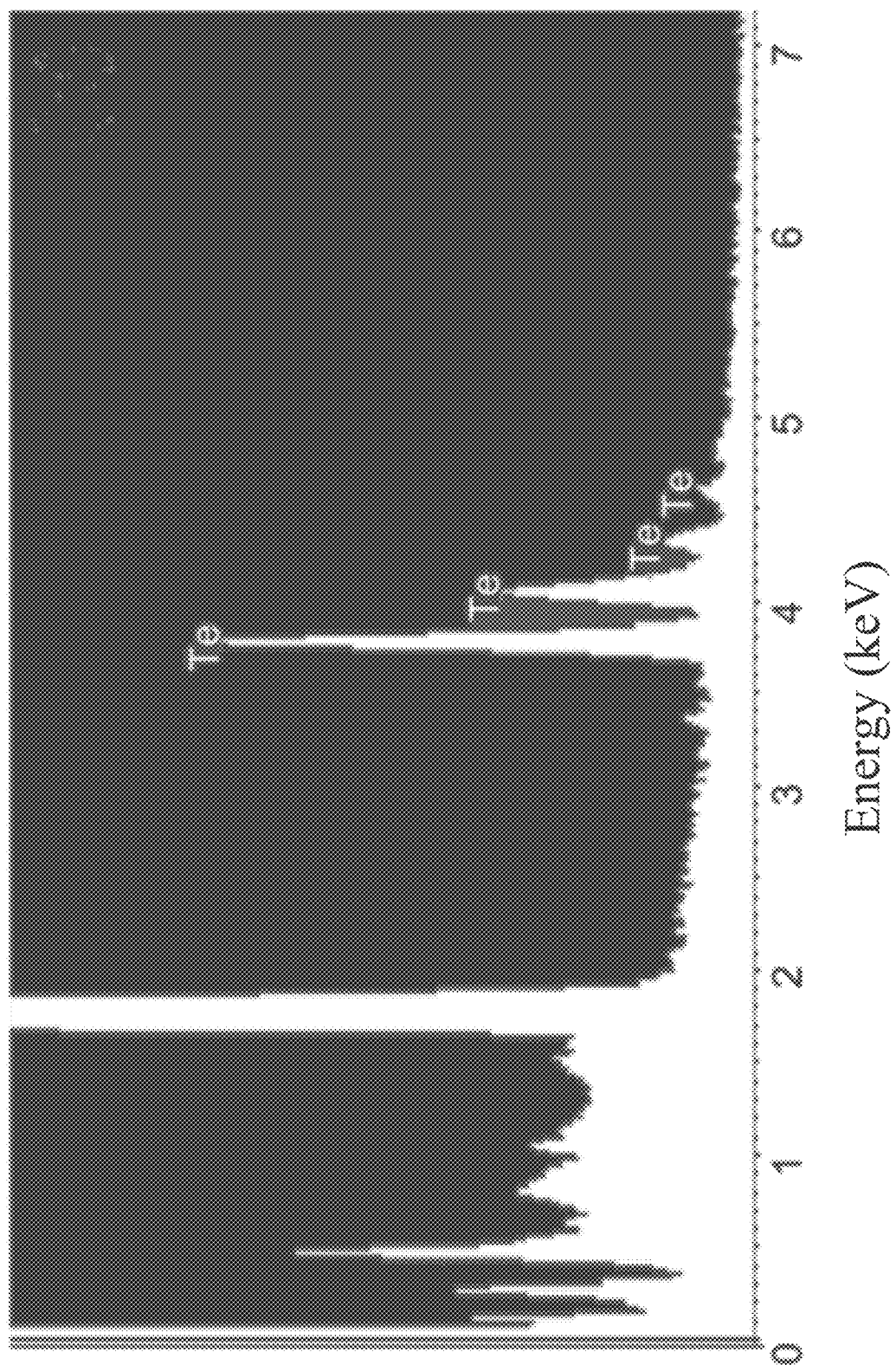
FIG. 7 is an energy-dispersive X-ray spectroscopy before reacting the thermoelectric nanosensor of FIG. 3 with a mercury ion.
Figure 8:
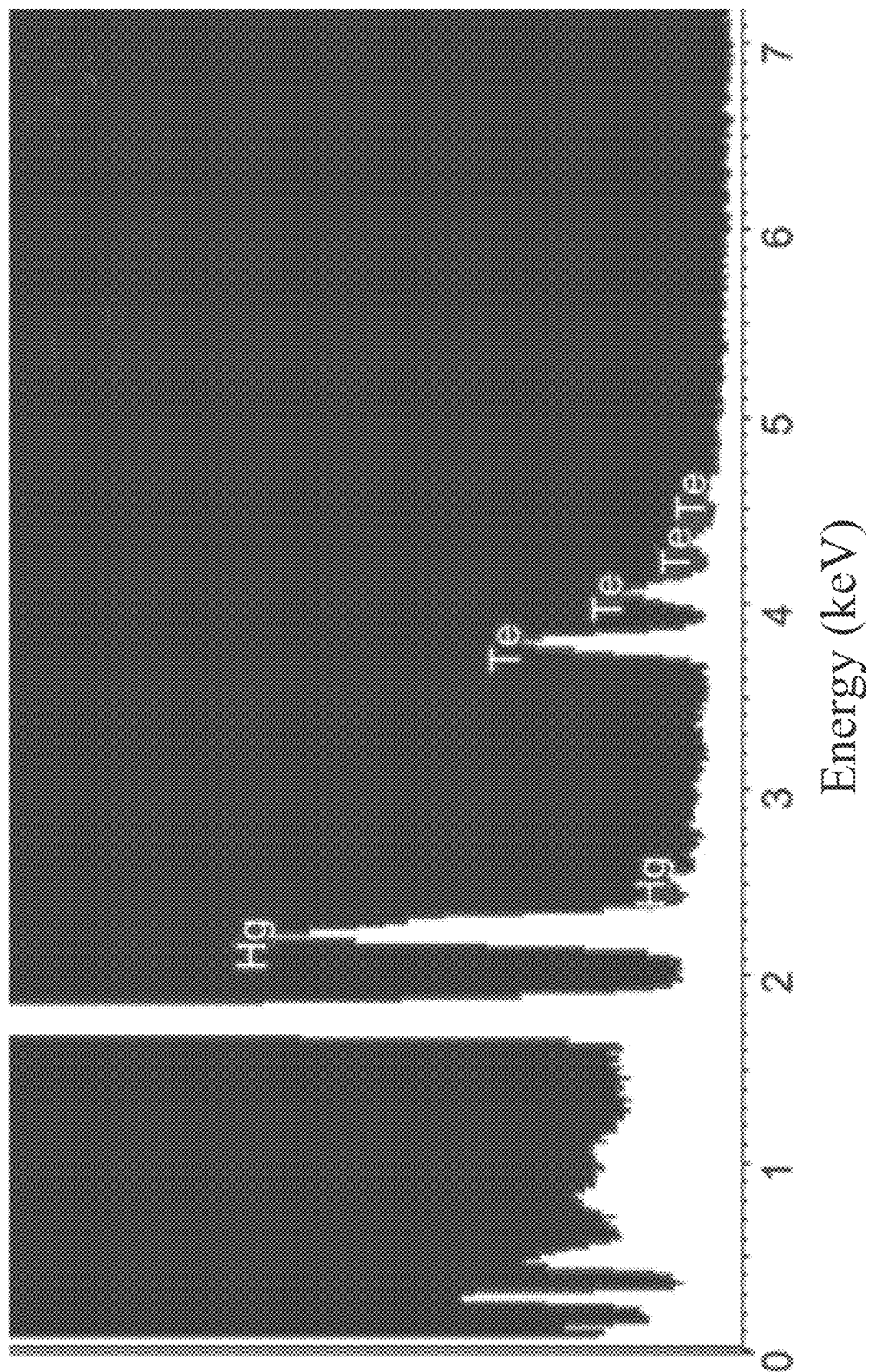
FIG. 8 is an energy-dispersive X-ray spectroscopy after reacting the thermoelectric nanosensor of FIG. 3 with a mercury ion.

FIG. 7 is an energy-dispersive X-ray spectroscopy (EDX) before reacting the thermoelectric nanosensor 100 of FIG. 3 with a mercury ion. FIG. 8 is an energy-dispersive X-ray spectroscopy after reacting the thermoelectric nanosensor 100 of FIG. 3 with a mercury ion. In FIG. 7, only tellurium can be detected before the reaction occurred. In FIG. 8, in addition to tellurium, mercury also can be detected. This shows that the mercury ion is indeed reacted with the tellurium nanostructure 120 of the thermoelectric nanosensor 100 and the mercury telluride nanostructure 121 is formed.

Figure 10:
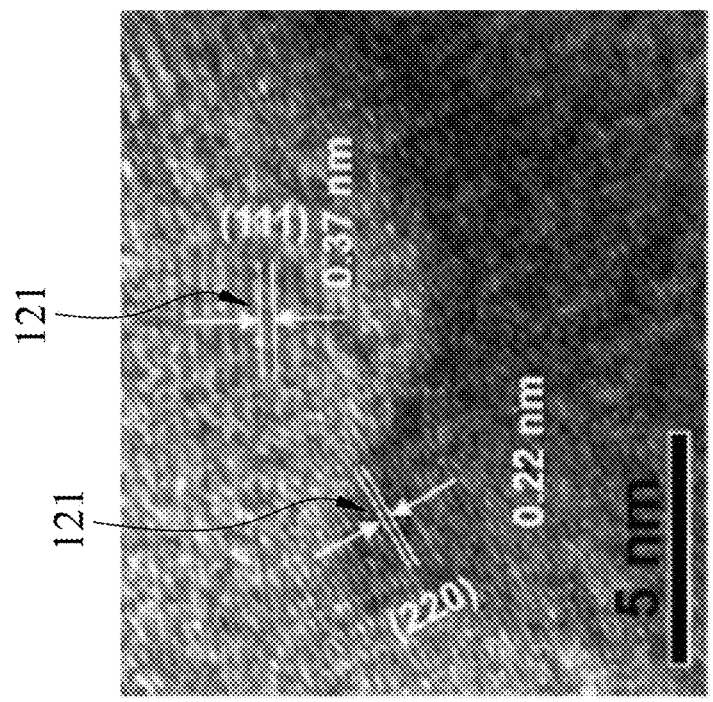
FIG. 10 is a high-resolution electron microscope image after reacting the thermoelectric nanosensor of FIG. 3 with a mercury ion.
Figure 9:
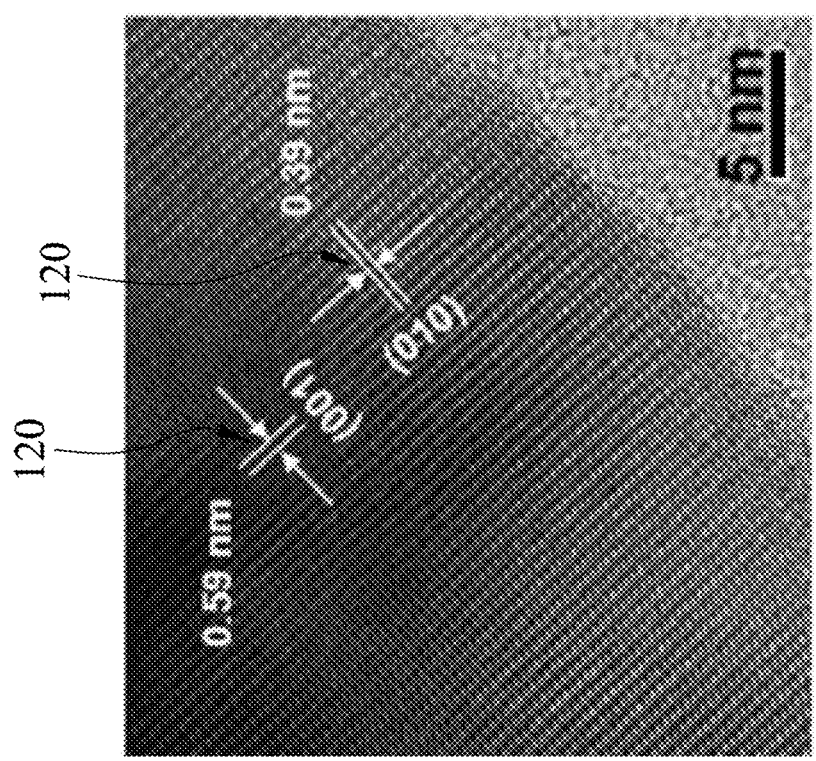
FIG. 9 is a high-resolution electron microscope image before reacting the thermoelectric nanosensor of FIG. 3 with a mercury ion.

FIG. 9 is a high-resolution electron microscope image before reacting the thermoelectric nanosensor 100 of FIG. 3 with a mercury ion. FIG. 10 is a high-resolution electron microscope image after reacting the thermoelectric nanosensor 100 of FIG. 3 with a mercury ion. In FIG. 9, only the tellurium nanostructure 120 is formed, a 0.59 nm inter-planar spacing and a 0.39 nm inter-planar spacing can be observed in the lattice plane (001) and the lattice plane (010), respectively. In FIG. 10, defects and dislocations are generated during the formation of the mercury telluride nanostructure 121, a 0.22 nm inter-planar spacing and a 0.37 nm inter-planar spacing can be observed in the lattice plane (220) and the lattice plane (111) of the mercury telluride nanostructure 121, respectively.

Figure 11A:
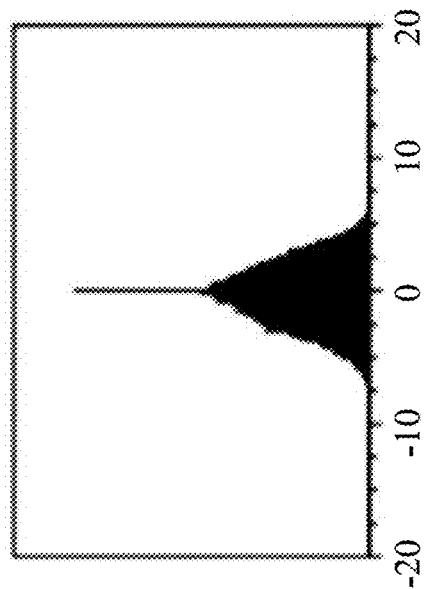
FIG. 11A shows a measured signal of a tellurium nanostructure under a room temperature using a Kelvin Probe Force Microscopy.
Figure 11B:
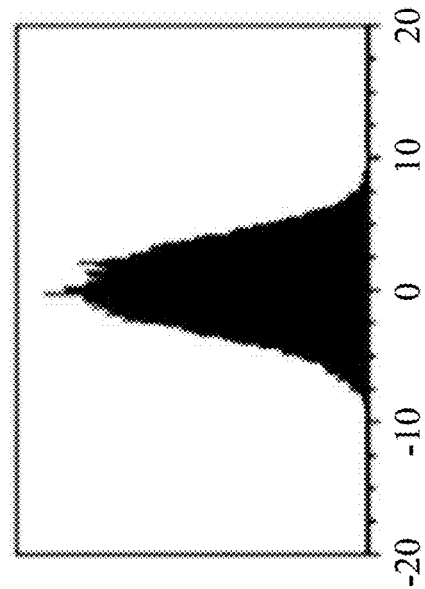
FIG. 11B shows a measured signal of a mercury telluride nanostructure under a room temperature using a Kelvin Probe Force Microscopy.
Figure 11C:
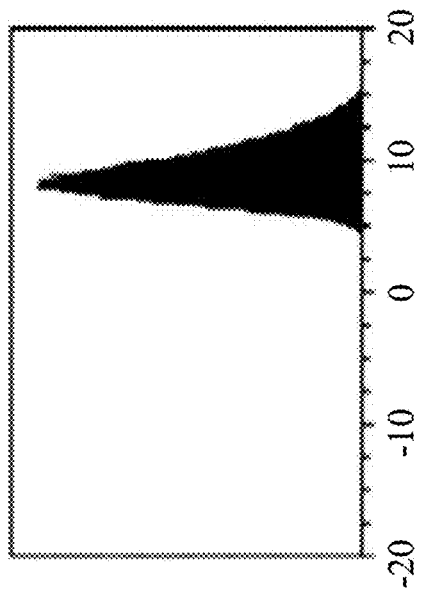
FIG. 11C shows a measured signal of a tellurium nanostructure after applying a temperature variation using a Kelvin Probe Force Microscopy.
Figure 11D:
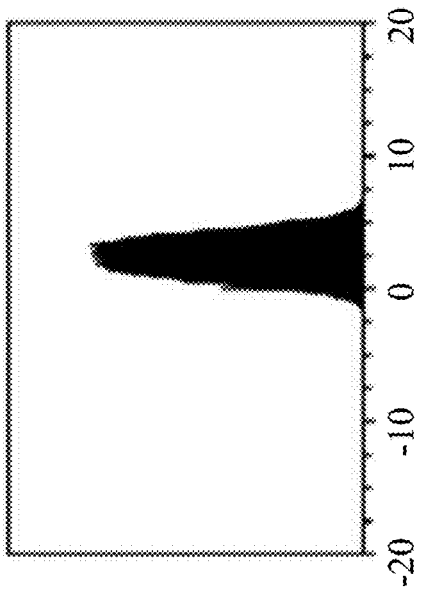
FIG. 11D shows a measured signal of a mercury telluride nanostructure after applying a temperature variation using a Kelvin Probe Force Microscopy.

FIG. 11A shows a measured signal of a tellurium nanostructure 120 under a room temperature using a Kelvin Probe Force Microscopy. FIG. 11B shows a measured signal of a mercury telluride nanostructure 121 under a room temperature using a Kelvin Probe Force Microscopy. FIG. 11C shows a measured signal of a tellurium nanostructure 120 after applying a temperature variation using a Kelvin Probe Force Microscopy. FIG. 11D shows a measured signal of a mercury telluride nanostructure 121 after applying a temperature variation using a Kelvin Probe Force Microscopy. Before heating, either in the tellurium nanostructure 120 (FIG. 11A) or the mercury telluride nanostructure 121 (FIG. 11B), no electrical signal is outputted (the response voltage peak is at 0 mV). After heating, a temperature variation will be generated thereby generating a thermoelectric effect, either in the tellurium nanostructure 120 (FIG. 11C) or the mercury telluride nanostructure 121 (FIG. 11D), an electrical signal is outputted (response voltage is greater than 0 mV). Furthermore, form FIGS. 11C and 11D, it can be observed that the electrical signal generated from the mercury telluride nanostructure 121 (the response voltage peak is at 7.5 mV) is greater than the electrical signal generated from the tellurium nanostructure 120 (the response voltage peak is at 2.5 mV). This can prove that the thermoelectric effect occurred both in the tellurium nanostructure 120 and the mercury telluride nanostructure 121, and the mercury telluride nanostructure 121 has a stronger thermoelectric effect. Therefore, the selectivity and the detectability of the mercury ion can be enhanced.

Figure 12:
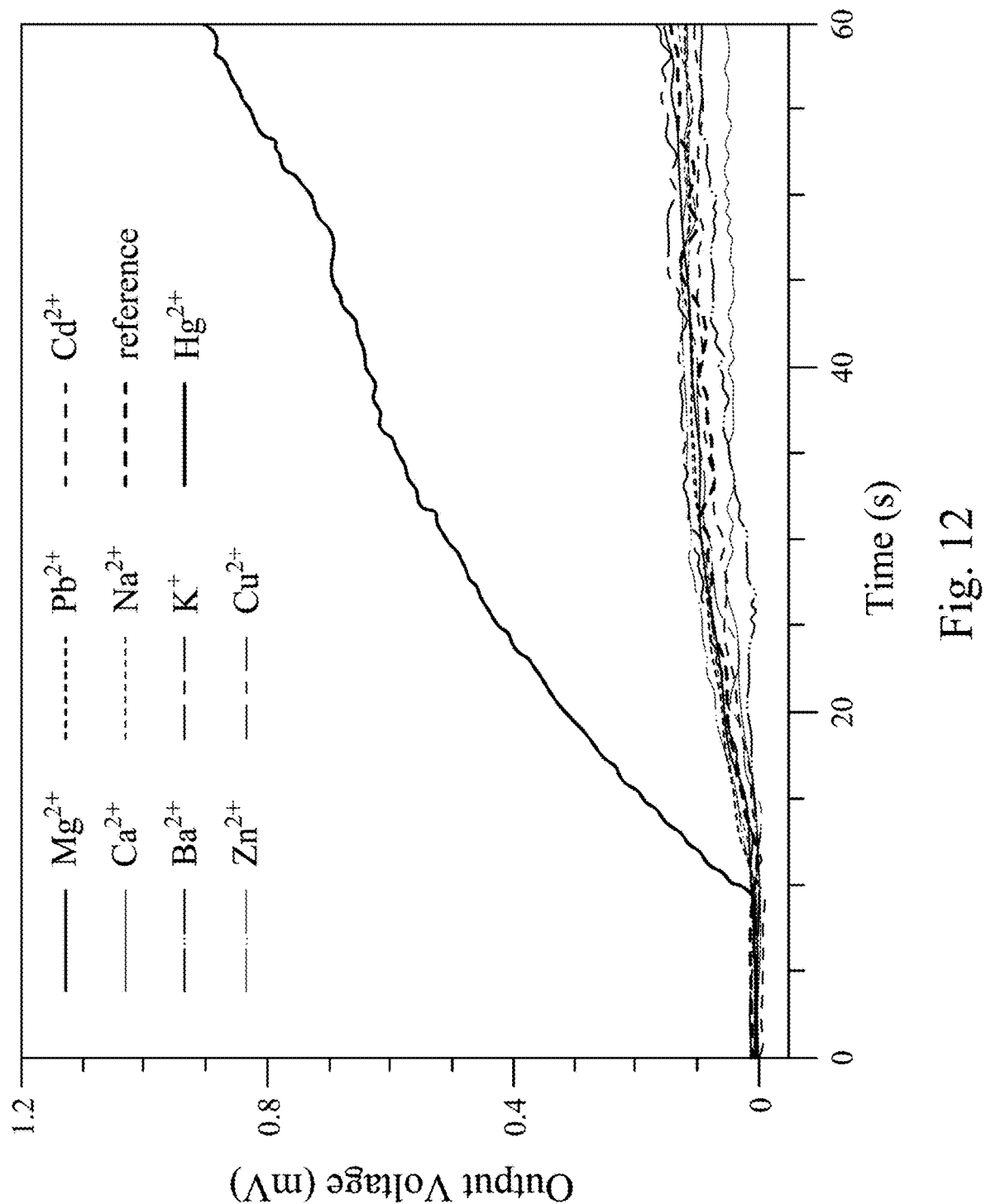
FIG. 12 shows a comparison of outputted electrical signals of various metal ions measured by the thermoelectric nanosensor of FIG. 3.

FIG. 12 shows a comparison of outputted electrical signals of various metal ions measured by the thermoelectric nanosensor 100 of FIG. 3. The test samples used for performing the measurement are from the drinking water in the environment, the lake water or the river water. During the measurement process, these water solutions are dropped on the thermoelectric nanosensor 100, and the thermoelectric nanosensor 100 is stood on a heated environment for a period of time, in order to generate a temperature variation and a stronger thermoelectric effect. In FIG. 12, the output voltage of the mercury ion is significantly greater than other metal ions, this shows that the mercury ion is indeed reacted with the thermoelectric nanosensor 100 for forming the mercury telluride nanostructure 121, and the mercury telluride nanostructure 121 has a stronger thermoelectric effect so that the thermoelectric nanosensor 100 has a high selectivity and a high detectability for the mercury ion. Furthermore, the quantitative value of the concentration of the mercury ion can also be obtained by analyzing the relationship between the concentration and the output voltage varied with time.

Form the aforementioned image analysis, composition analysis and electrical analysis, it can prove that the formation of the mercury telluride nanostructure 121 and the occurrence of the thermoelectric effect.

In the present disclosure, the tellurium nanostructure 120 works as a main detecting part of the thermoelectric nanosensor 100. The test sample can be directly dropped on the thermoelectric nanosensor 100 for performing the analysis without requiring any pre-treatment process. When the test sample contains a mercury ion, the mercury ion will reacted with the tellurium nanostructure 120 for forming the mercury telluride nanostructure 121, and different quantity of the mercury ion will form different quantity of mercury telluride nanostructure 121. Since the thermoelectric effects are different in the tellurium nanostructure 120 and the mercury telluride nanostructure 121, when the thermoelectric nanosensor 100 is heated or cooled, the mercury telluride nanostructure 121 will output a significant electrical signal. The concentration of the mercury ion and the outputted electrical signal have a specified ratio, therefore, a quantitative analysis can be performed for obtained the quantitative value of the concentration of the mercury ion by analyzing the amplitude of the electrical signal.

In the present disclosure, the tellurium nanostructure 120 works as a main detecting part of the thermoelectric nanosensor 100. The test sample can be directly dropped on the thermoelectric nanosensor 100 for performing an analysis without any pre-treatment processes. When the test sample contains a mercury ion, the mercury ion can be combined with the tellurium nanostructure 120 for forming the mercury telluride nanostructure 121. When the mercury telluride nanostructure 121 is heated or cooled, a strong electrical signal will be generated. The concentrations of the mercury ions has specified ratio with the electrical signal. Therefore, the quantitative value of the concentrations of the mercury ions can be determined.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A thermoelectric nanosensor, comprising:
   a first conductive material;
   a plurality of individual tellurium nanostructures located on the first conductive material, wherein each of the tellurium nanostructures has a top surface;
   an isolation layer located on each of the tellurium nanostructures, wherein the isolation layer has an upper surface and a lower surface, and the lower surface of the isolation layer is disposed on the top surfaces of at least some of the tellurium nanostructures; and
   a second conductive material individually disposed on the upper surface of the isolation layer;
   wherein the isolation layer is disposed between the first conductive material and the second conductive material.

2. The thermoelectric nanosensor of claim 1, further comprising:
   a patterned layer located on the first conductive material, wherein the patterned layer divides the tellurium nanostructures into a plurality of regions.

3. The thermoelectric nanosensor of claim 2, wherein a material of the patterned layer is a polyethylene terephthalate, a polyethylene, a polypropylene, a polyvinyl chloride, a polystyrene or a polycarbonate.

4. The thermoelectric nanosensor of claim 1, wherein a material of the isolation layer is a polypyrrole, a polyaniline, a polythiophene, a polyphenylene sulfide, a polyacetylene, a phenylacetylene or a derivative thereof.

5. The thermoelectric nanosensor of claim 1, wherein the tellurium nanostructures output an electrical signal under a temperature variation.

6. The thermoelectric nanosensor of claim 1, wherein each of the tellurium nanostructures is reacted with a test sample to form a telluride nanostructure.

7. The thermoelectric nanosensor of claim 6, wherein the telluride nanostructure outputs an electrical signal under a temperature variation.

8. The thermoelectric nanosensor of claim 1, wherein a test sample is attached on each of the tellurium nanostructures for changing a resistance of the thermoelectric nanosensor.

9. The thermoelectric nanosensor of claim 1, wherein each of the tellurium nanostructures is a zero dimensional structure, a one dimensional structure or a two dimensional structure.

10. The thermoelectric nanosensor of claim 1, wherein the first conductive material has an upper surface, and the tellurium nanostructures are directly grown on the upper surface of the first conductive material.

* * * * *